US006437356B1

(12) United States Patent
Yasuda et al.

(10) Patent No.: US 6,437,356 B1
(45) Date of Patent: Aug. 20, 2002

(54) METHOD AND APPARATUS FOR PROCESSING PAPER MONEY

(75) Inventors: Shigeru Yasuda, Tsurugashima; Takeshi Ishida, Sakado; Yuichi Sakamoto, Higashimatsuyama, all of (JP)

(73) Assignee: Kabushiki Kaisha Nippon Conlux, Tokyo (JP)

( * ) Notice: Subject to any disclaimer, the term of this patent is extended or adjusted under 35 U.S.C. 154(b) by 0 days.

(21) Appl. No.: 09/424,964

(22) PCT Filed: Mar. 30, 1999

(86) PCT No.: PCT/JP99/01623

§ 371 (c)(1), (2), (4) Date: Dec. 1, 1999

(87) PCT Pub. No.: WO99/50798

PCT Pub. Date: Oct. 7, 1999

(30) Foreign Application Priority Data

Apr. 1, 1998 (JP) ............................................ 10-88720

(51) Int. Cl.[7] ........................ G01N 21/86; H01J 40/14; G07F 7/04

(52) U.S. Cl. ............................ 250/559.4; 250/559.29; 250/222.1; 356/434; 356/448; 194/207

(58) Field of Search .......................... 250/222.1, 559.4, 250/559.29, 556; 356/71, 446, 434, 448; 194/207

(56) References Cited

U.S. PATENT DOCUMENTS

| | | | | |
|---|---|---|---|---|
| 4,784,274 A | * 11/1988 | Mori et al. | ................. | 209/534 |
| 5,289,011 A | * 2/1994 | Wong et al. | ........... | 250/559.29 |
| 5,419,423 A | * 5/1995 | Ishida et al. | ................ | 194/206 |
| 5,437,357 A | * 8/1995 | Ota et al. | .................... | 194/206 |
| 5,709,293 A | * 1/1998 | Ishida et al. | ................ | 194/200 |

FOREIGN PATENT DOCUMENTS

| | | |
|---|---|---|
| JP | 2-193288 | 7/1990 |
| JP | 6-111096 | 4/1994 |
| JP | 6-139427 | 5/1994 |
| JP | 07-192162 | 7/1995 |

* cited by examiner

*Primary Examiner*—Stephone Allen
*Assistant Examiner*—Eric Spears
(74) *Attorney, Agent, or Firm*—Hogan & Hartson, L.L.P.

(57) ABSTRACT

A criterion for recognizing the presence of paper money is determined from the output of the photosensor (12) in its standby state when paper money is inserted. The criterion is stored in memory (15) for use to detect the existence of paper money.

6 Claims, 11 Drawing Sheets

METHOD AND APPARATUS FOR PROCESSING PAPER MONEY

TECHNICAL FIELD

This invention relates to a method and apparatus for processing paper moneys used in various kinds of automatic service machines such as automatic vending machines or the like, and more particularly, to a method and apparatus for processing paper moneys capable of preventing malfunctioning of the apparatus due to soiling of photosensors.

BACKGROUND ART

A paper money processing apparatus used in an automatic service machine, such as an automatic vending machine, is composed such that it conveys a paper money inserted via a paper money input opening into the apparatus by means of a conveyor belt driven by a transfer motor, causing the paper money to pass a position where a paper money identification sensor is installed. A paper money that is determined to be genuine on the basis of the output of the paper money identification sensor is held temporarily in reserve (escrow). Thereafter, if a money return command is issued, then the paper money held temporarily in reserve is returned to the paper money input opening by driving the transfer motor in reverse, whereas if a money collection command is issued, then the paper money held temporarily in reserve is stored in a stacker.

FIG. 7 is a side view illustrating an example of configuration of a paper money processing apparatus.

In this diagram, the paper money processing apparatus comprises a paper money input opening 51, a paper money conveyance path 52, a stacker 53, a shutter 54, a shutter motor 55, a paper money conveyor belt 56, pulleys 57 and 58, an entrance sensor 59, an photosensor 60, a magnetic sensor 61, and a paper money passage sensor 62.

When a paper money 70 is inserted into the paper money processing apparatus 50, firstly, the paper money 70 is inserted via the paper money input opening 51. When the paper money 70 is input, it is detected by the entrance sensor 59, and the shutter 54 is opened by driving the shutter motor 55. When the shutter 54 is open, the paper money 70 is conveyed into the paper money conveyance path 52 by means of the paper money conveyor belt 56 supported by pulleys 57 and 58, which are driven by a transfer motor (not illustrated). When the paper money 70 conveyed into the paper money conveyance path 52 passes the photosensor 60 and magnetic sensor 61, the authenticity of the paper money is determined according to the outputs of the sensors.

When the paper money 70 has passed the photosensor 60 and the magnetic sensor 61, conveyance thereof is halted in the position indicated in FIG. 8, for example, and it is held temporarily in reserve (escrow). In this case, if it is determined that the paper money 70 is not genuine, or if a money return command is issued by the user, then the paper money 70 is ejected via the paper money input opening by driving the transfer motor (not illustrated) in reverse. On the other hand, if the user selects a product to buy (in the case of an automatic vending machine), or the like, whilst the paper money 70 is held temporarily in reserve, a control section (not illustrated) initiates money collection processing for collecting and storing the paper money 70, and on this basis the transfer motor (not illustrated) is driven forwards and the paper money 70 is conveyed and stored in a stacker 53.

The output from the photosensor 60 is used not only to determine whether or not an input paper money 70 is genuine, but also whether or not a paper money is present, and along with the outputs from the entrance sensor 59, paper money passage sensor 62, and the like, it is used to detect the position of the paper money 70 in the paper money conveyance path 52, various controls being implemented on the basis of these detection results.

FIGS. 9(*a*) and 9(*b*) are diagrams illustrating the states of various sections when paper money 70 is inserted into the paper money processing apparatus 50.

When a paper money 70 is inserted into the paper money input opening 51, as illustrated in FIG. 9(*a*), firstly, the entrance sensor 59 detects the paper money 70, and on the basis of this the transfer motor (not depicted) is driven in a forward direction, thereby starting conveyance of the paper money 70. When the paper money 70 is conveyed into the paper money conveyance path 52, this is detected by the photosensor 60, whereupon the paper money passage sensor 62 detects the paper money 70. When the paper money 70 thus conveyed has passed the position of the photosensor 60 and reaches the position where it is temporarily held in reserve, the transfer motor is halted. Thereupon, if the control unit (not illustrated) issues a money collection command, the transfer motor is driven forwards again, and the paper money 70 is stored in the stacker 53.

Furthermore, if a money return command is issued by the control unit whilst the paper money 70 is being held in reserve temporarily, then as illustrated in FIG. 9(*b*), the transfer motor is driven in reverse, and the paper money 70 is conveyed in the direction of the paper money input opening 51, passing successively through the positions of the photosensor 60 and entrance sensor 59 and being ejected via the paper money input opening 51.

Thus, in the paper money processing apparatus 50, since each section is controlled on the basis of outputs from various sensors, it is possible to detect irregular states on the basis of these various sensor outputs.

FIGS. 10(*a*) and 10(*b*) are diagrams illustrating examples where an irregular state is detected.

FIG. 10(*a*) shows an example where reverse conveyance of a paper money is detected, in which after the paper money 70 has been held temporarily in reserve, it is detected by the photosensor 60, which would not be expected to detect this paper money if it was being stored, and hence it is recognized that an irregular extraction operation has been performed with regard to the paper money 70, the transfer motor is halted and processing relating to the extraction operation is carried out.

FIG. 10(*b*) shows as example where a paper money jam is detected: in the process of inserting the paper money 70, the photosensor 60 detects the paper money 70 continuously, even though the transfer motor is being driven forwards to convey the paper money 70, and hence it is recognized that a paper money jam has occurred, the transfer motor is halted and processing relating to the paper money jam is carried out.

In some cases, the output level of the photosensor 60 may vary, due to dirt, or the like. In particular, since the paper money processing apparatus 50 is used in automatic vending machines, and the like, depending on the position and environment in which the machine is installed, it is possible that dirt may accumulate on the photosensor 60, causing the output level thereof to become unstable.

For example, when the output level of a photosensor 60, which normally has an output level as illustrated in FIG. 11(*a*) (in a state where there is little soiling), approaches, at standby mode, close to the judgement value (threshold level)

for determining whether or not a paper money 70 is present as shown in FIG. 11(*b*), due to accumulation of dirt, then the detection results of the sensor become unstable, and the sensor may assume an unstable state. As a result, although detection results are relatively stable when the apparatus is at standby, if a paper money 70 is inserted, the sensor continues to detect the paper money 70 even after it has passed.

When the output level of the photosensor 60 enters this state, it starts to detect a paper money that is not actually present, and hence the outputs of each sensor will match the sensor outputs in cases where a paper money is conveyed in the reverse direction or a paper money becomes jammed, as illustrated in FIG. 10, thereby causing the control unit (not illustrated) to perform an irregular halt, or other such processing, in other words, causing the apparatus to malfunction.

As described above, in a paper money processing apparatus, the output level of a photosensor used therein may become unstable due to accumulation of dirt, thereby leading to malfunctioning. Not only does malfunctioning of this kind create losses for the product vending company (in cases where the apparatus is used in an automatic vending machine), but it also causes mistrust and annoyance to the customer.

DISCLOSURE OF THE INVENTION

Accordingly, an object of this invention is to provide a method and an apparatus for processing paper moneys, whereby the rate of detection error due to soiling of photosensors can be reduced, thereby preventing malfunction.

In order to achieve this object, a first aspect of the invention is a paper money processing method wherein position of an inserted paper money is detected on the basis of presence or absence of the paper money by at least one photosensor, the inserted paper money being conveyed to be accepted or returned on the basis of the position of the paper money thus detected, wherein a judgement value for judging the paper money is set each time a paper money is inserted, and the judgement value is compared with output level of the photosensor, and the presence or absence of the inserted paper money is detected on the basis of results of the comparison.

Further, a second aspect of the invention is the paper money processing method according to the first aspect, characterized in that the judgement value is set according to output level of the photosensor in a standby state immediately prior to insertion of the paper money.

A third aspect of the invention is the paper money processing method according to the first aspect, characterized in that a predetermined judgement value is taken as a first judgement value while the judgement value that is set each time the paper money is inserted is taken as a second judgement value, and the presence or absence of a paper money is detected on the basis of the result of comparison between the first judgement value and the output level of the photosensor in a standby state where no paper money has been inserted, and the presence or absence of a paper money is detected on the basis of the result of comparison between the second judgement value and the output level of the photosensor in a state where a paper money has been inserted.

A fourth aspect of the invention is a paper money processing method wherein position of an inserted paper money is detected on the basis of presence or absence of the paper money by at least one photosensor, the inserted paper money being conveyed to be accepted or returned on the basis of the position of the paper money thus detected, comprising an entrance sensor for detecting that a paper money has been inserted; setting means for setting a judgement value for judging the paper money each time that insertion of a paper money is detected by the entrance sensor; storage means for storing the judgement value set by the setting means; and comparing means for comparing the judgement value stored in the storage means with output level of the photosensor, whereby absence or presence of the inserted paper money is detected on the basis of the comparison results from the comparing means.

A fifth aspect of the invention is the paper money processing apparatus according to the fourth aspect, characterized in that the setting means sets the judgement value according to the output level of the photosensor in a standby state immediately prior to insertion of the paper money.

A sixth aspect of the invention is the paper money processing apparatus according to the fourth aspect, characterized in that the storage means stores a predetermined judgement value as a first judgement value and stores the judgement value set by the setting means as a second judgement value, and wherein the comparing means compares the first judgement value stored in the storing means with the output level of the photosensor in a state where the entrance sensor has not detected insertion of a paper money, and compares the second judgement value stored in the storing means with the output level of the photosensor in a state where the entrance sensor has detected insertion of a paper money.

BEST MODE FOR CARRYING OUT THE INVENTION

Below, an embodiment of a method and apparatus for processing paper moneys according to the present invention is described in detail with reference to the accompanying drawings.

Figure 1:
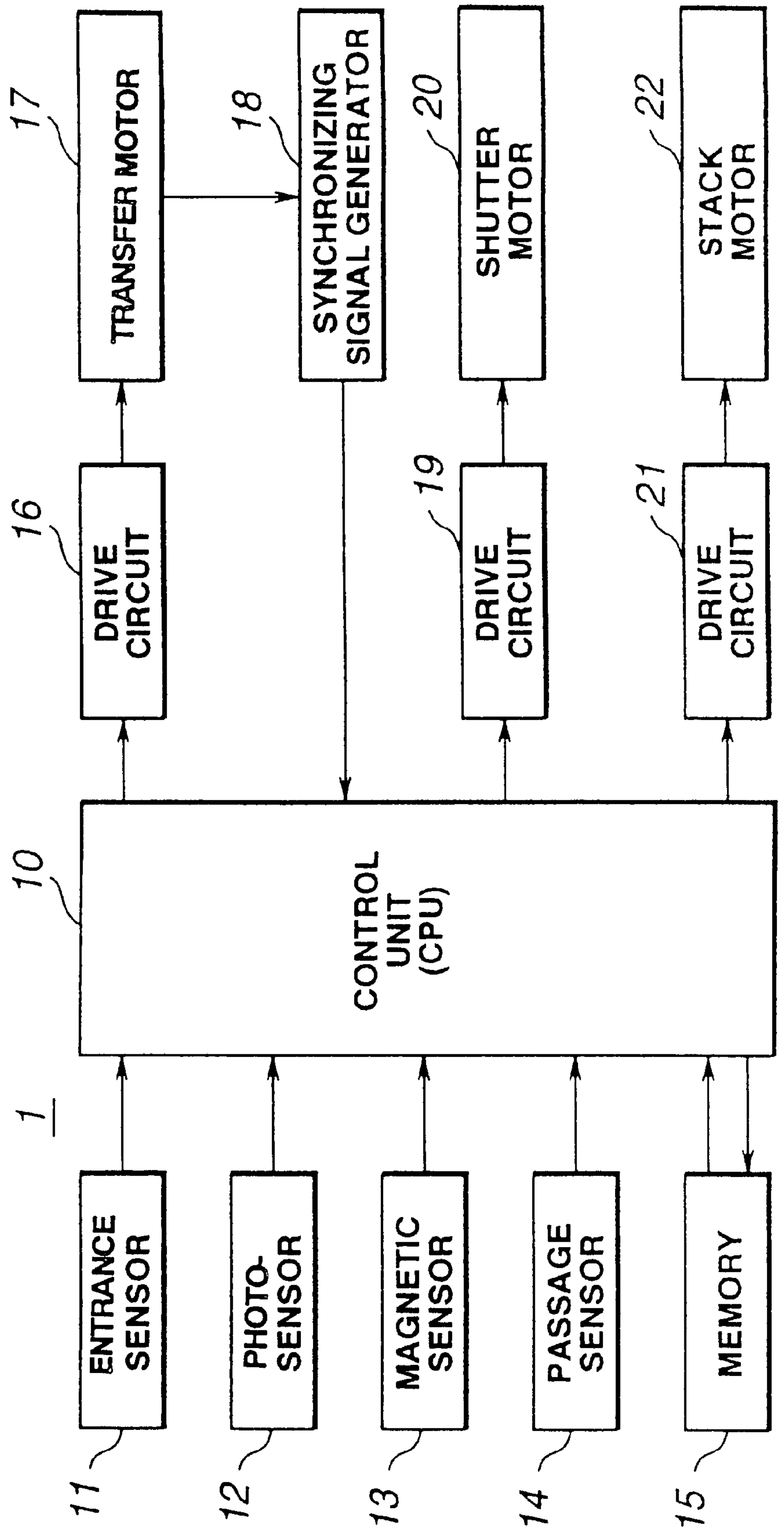
FIG. 1 is a block diagram illustrating the configuration of a control system of a paper money processing apparatus according to an embodiment of this invention.

FIG. 1 is a block diagram illustrating the configuration of a control system of a paper money processing apparatus according to this invention.

In FIG. 1, the paper money processing apparatus 1 comprises a control unit (CPU) 10, an entrance sensor 11, an photosensor 12, a magnetic sensor 13, a (paper money) passage sensor 14, a memory 15, a drive circuit 16, a paper money transfer motor 17, a synchronizing signal generating unit 18, a drive circuit 19, a shutter motor 20, a drive circuit 21, and a stack motor 22.

Figure 7:
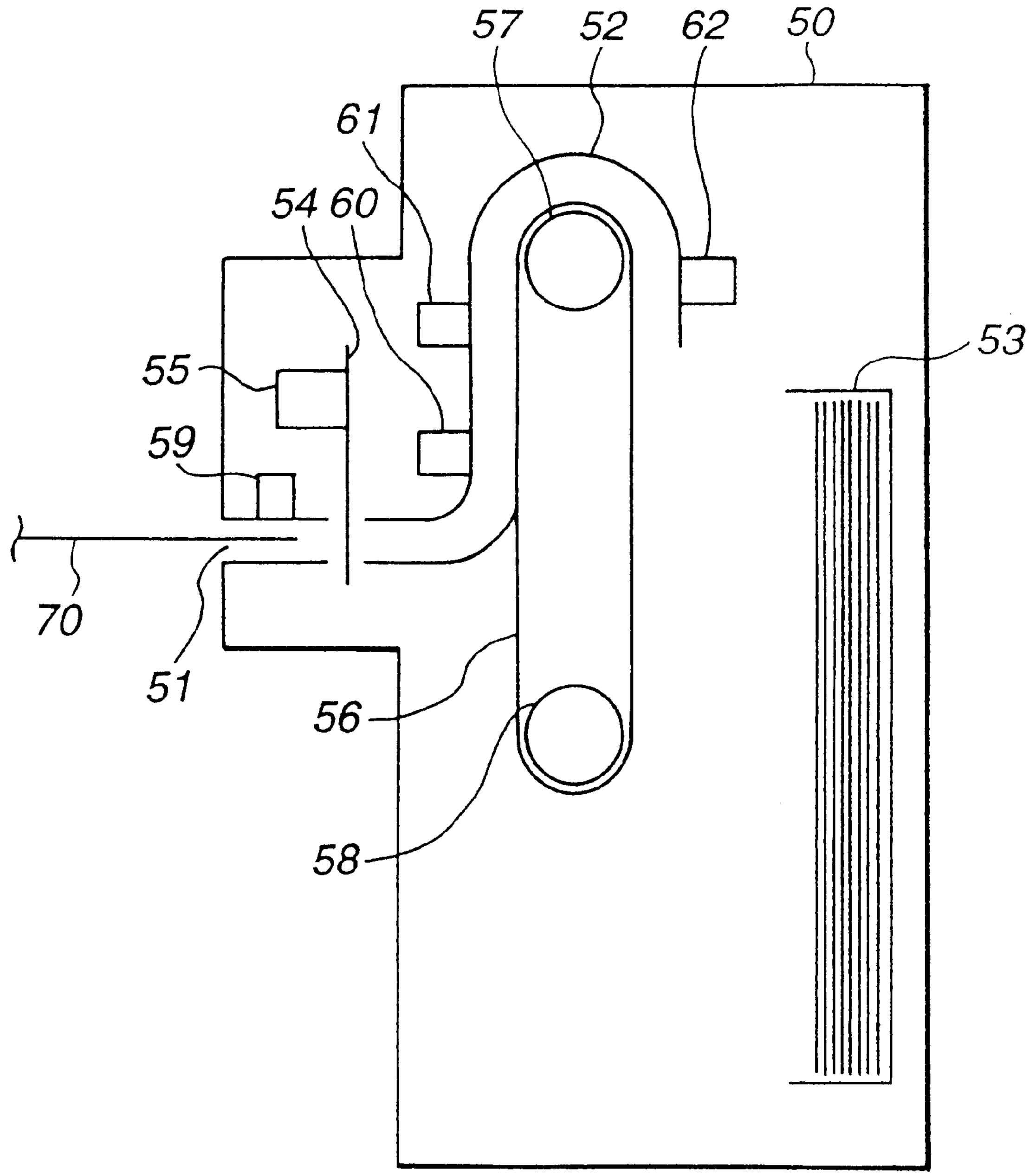
FIG.7 PRIOR ART
FIG. 7 is a side view illustrating an example of configuration of a paper money processing apparatus.
Figure 8:
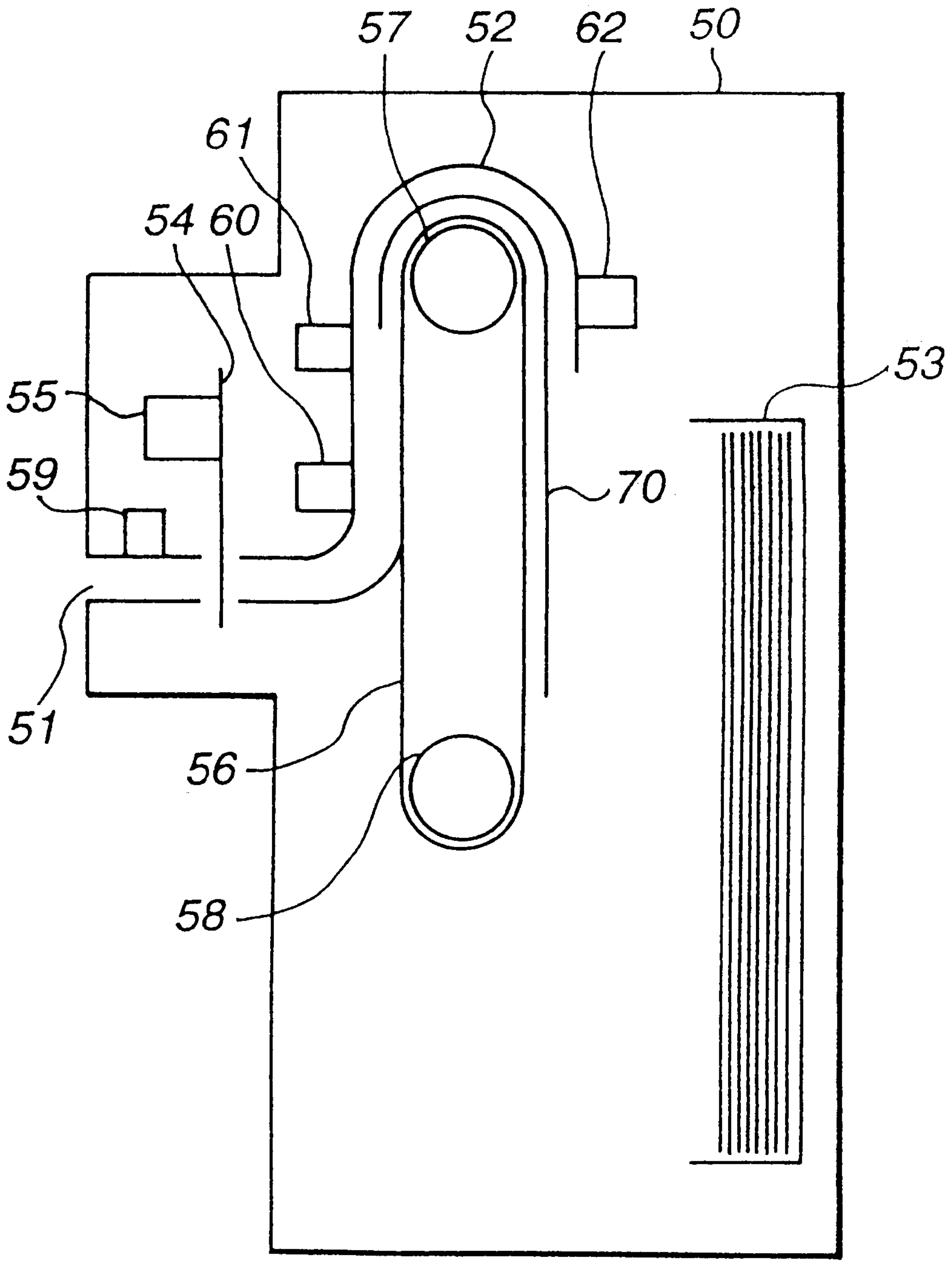
FIG.8 PRIOR ART
FIG. 8 illustrates a state where a paper money is held temporarily in reserve.
Figure 9A:
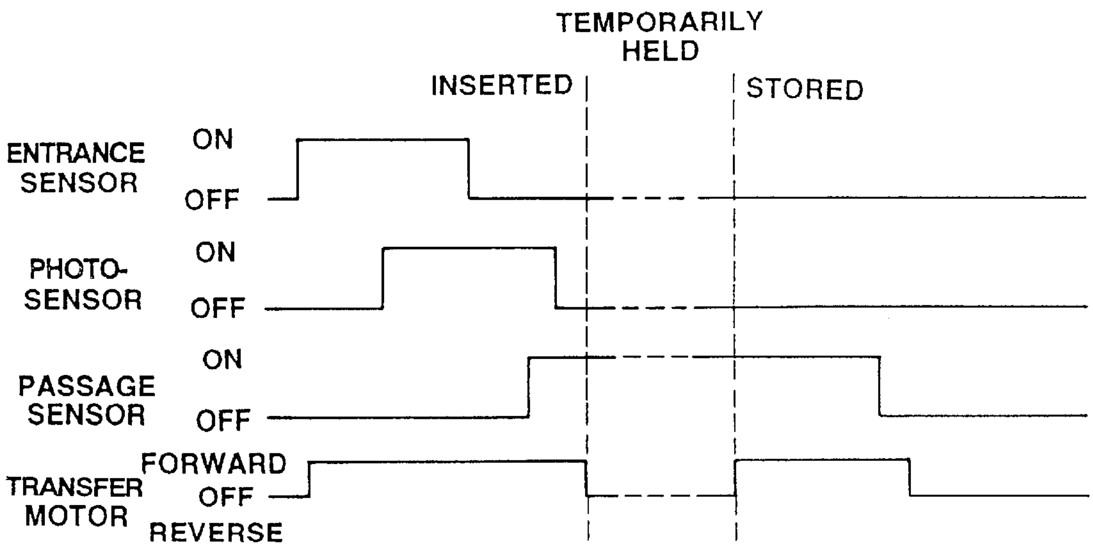
FIG.9(a) PRIOR ART
FIGS. 9(*a*) and 9(*b*) are diagrams illustrating the state of various sections when a paper money 70 is inserted into a paper money processing apparatus 50.
Figure 9B:
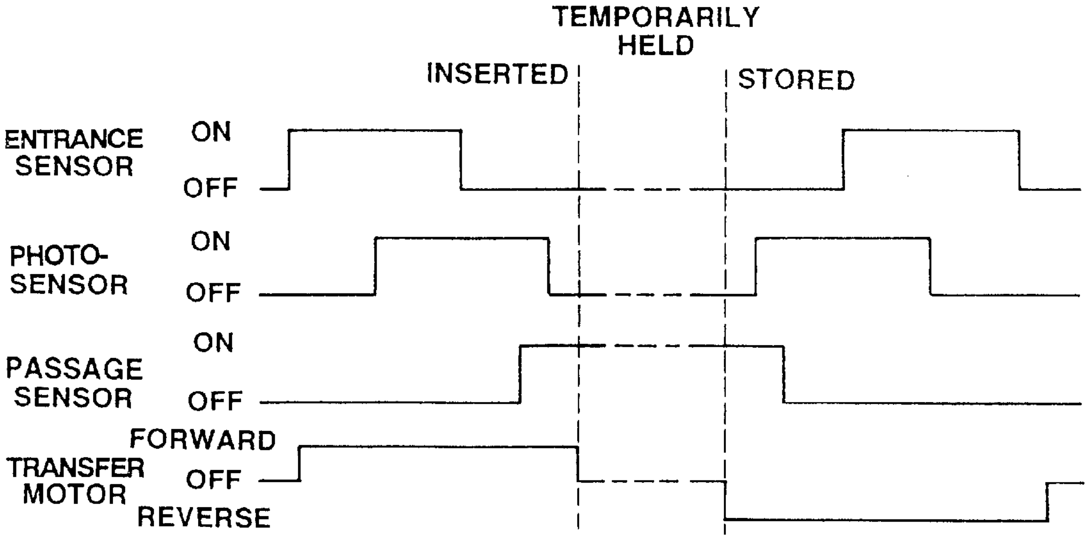
FIG.9(b) PRIOR ART
Figure 10A:
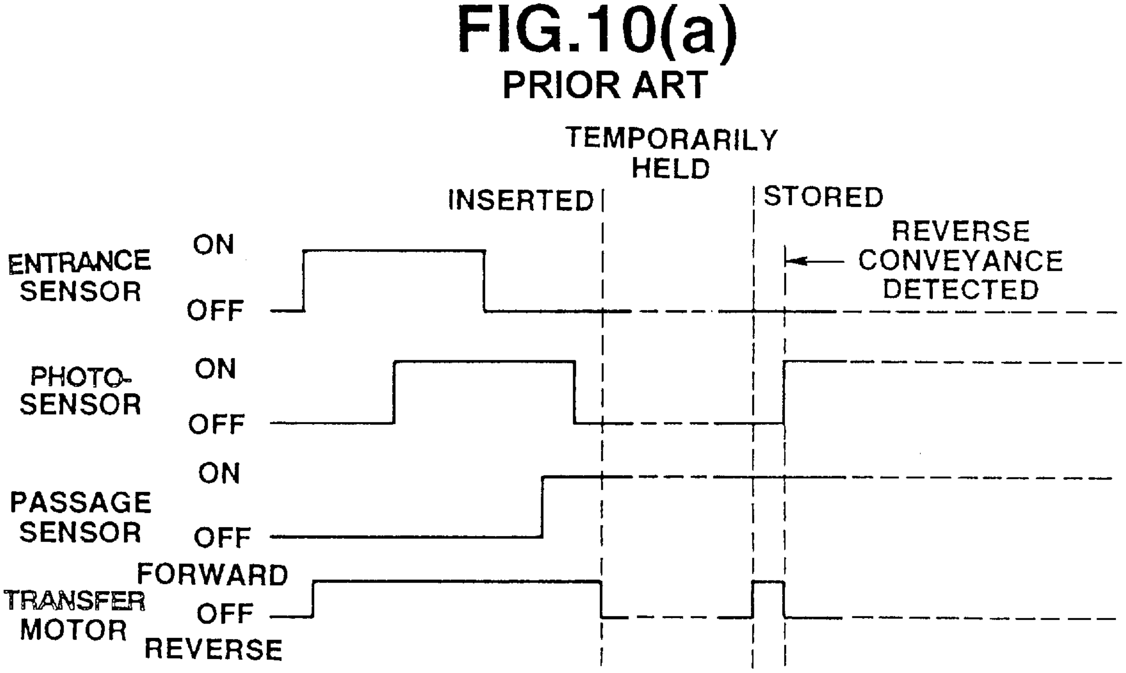
FIG.10(a) PRIOR ART
FIGS. 10(*a*) and 10(*b*) are diagrams illustrating examples where an irregular state is detected.
Figure 10B:
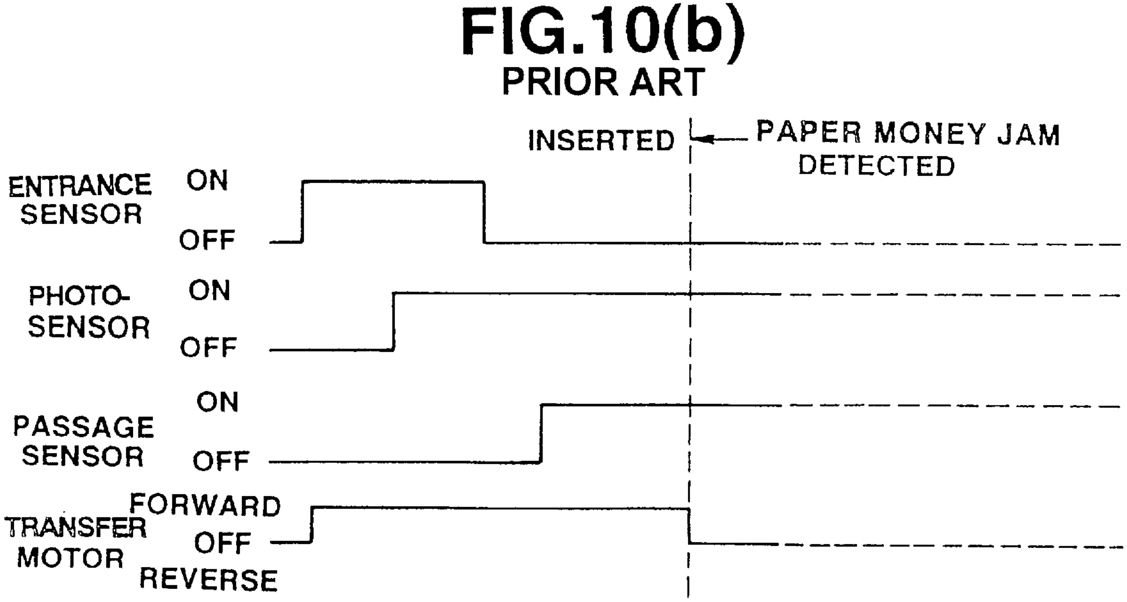
FIG.10(b) PRIOR ART
Figure 11A:
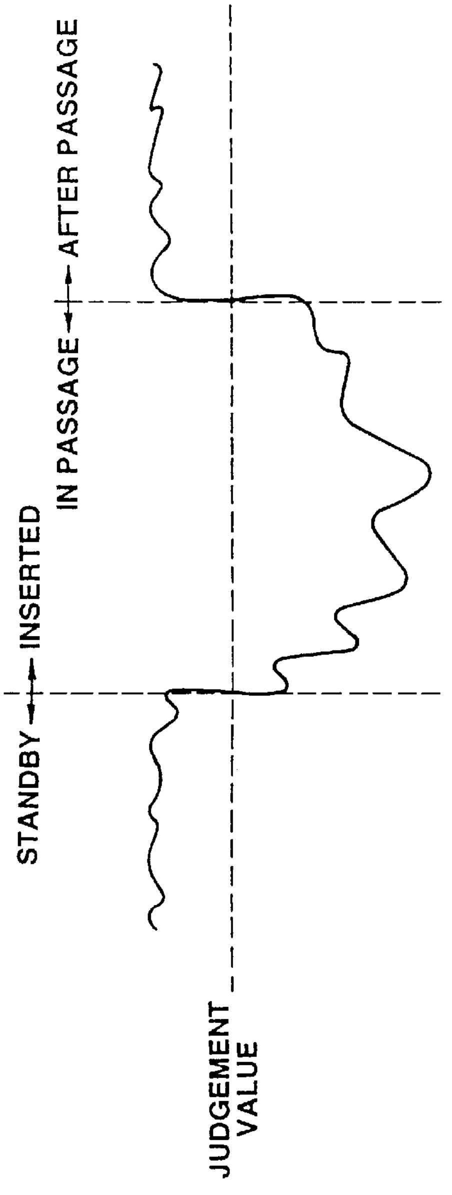
FIG.11(a) PRIOR ART
FIGS. 11(*a*) and 11(*b*) are diagrams illustrating changes in the output level of a photosensor due to soiling.
Figure 11B:
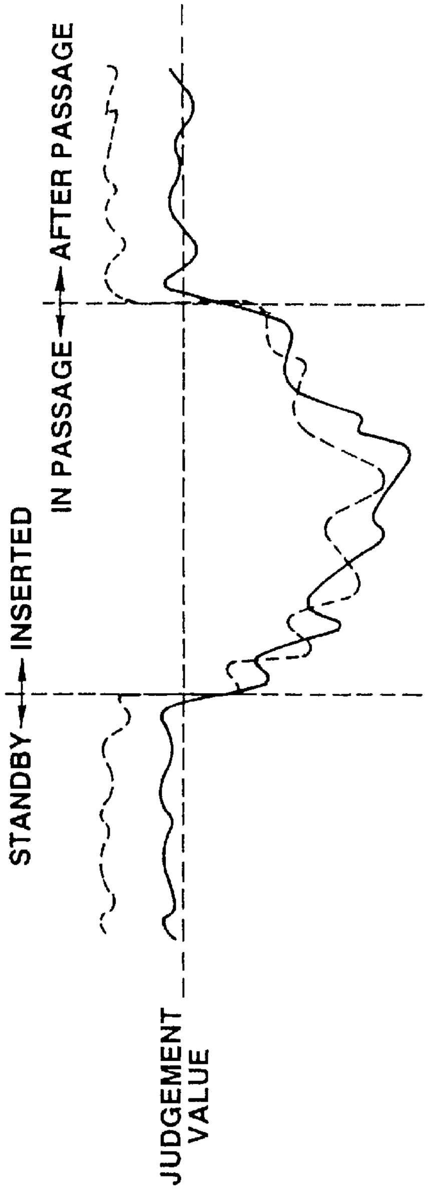
FIG.11(b) PRIOR ART

The paper money processing apparatus is of the same configuration as the paper money processing apparatus 50 (see FIG. 7) described above in relation to the prior art, and the entrance sensor 11, photosensor 12, magnetic sensor 13, and passage sensor 14 each correspond respectively to the entrance sensor 59, photosensor 60, magnetic sensor 61 and paper money passage sensor 62.

The memory 15 stores judgement values, and the like, for determining whether or not a paper money is present from the respective outputs of the entrance sensor 11, photosensor 12, magnetic sensor 13 and passage sensor 14. The paper money transfer motor 17 provides motive power for driving a paper money conveyor belt (not illustrated) in order to convey the inserted paper money, and the drive circuit 16 is a circuit for driving the paper money transfer motor 17. The synchronizing signal generating unit 18 outputs a signal synchronized to the rotation of the paper money transfer motor 17. Since the synchronizing signal generated by the synchronizing signal generating unit 18 also forms a value indicating the distance traversed by the paper money, it is possible to detect a paper money jam in cases where the counted value of the synchronizing signal and the current position of the paper money according to the outputs from the sensor do not coincide with each other.

The shutter motor 20 provides motive power for driving the shutter (not illustrated), and drive circuit 19 is the drive circuit for same. Stack motor 22 provides motive power for driving a mechanism (not illustrated) which serves to store a paper money held temporarily in reserve into a stacker (not illustrated), and drive circuit 21 is the drive circuit for same.

In the paper money processing apparatus 1, two judgement values (threshold levels) are set for determining whether or not a paper money is present from the output of the photosensor 12. Of these judgement values, one is a first judgement value having a predetermined fixed level and the other is a second judgement value determined according to the standby (output) level of the photosensor 12 immediately before a paper money is inserted.

Figure 2A:
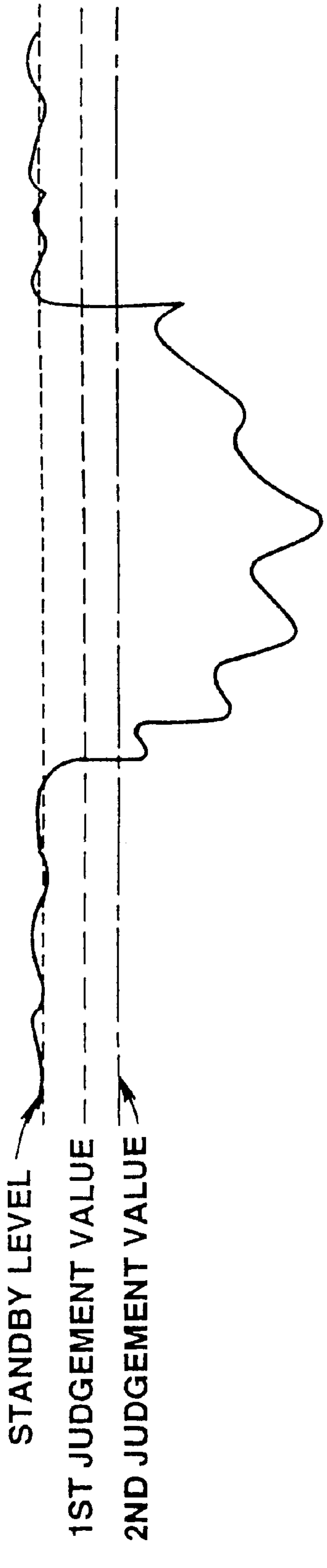
FIGS. 2(*a*) and 2(*b*) are diagrams illustrating examples of standby levels and judgement values relating to a photosensor 12.
Figure 2B:
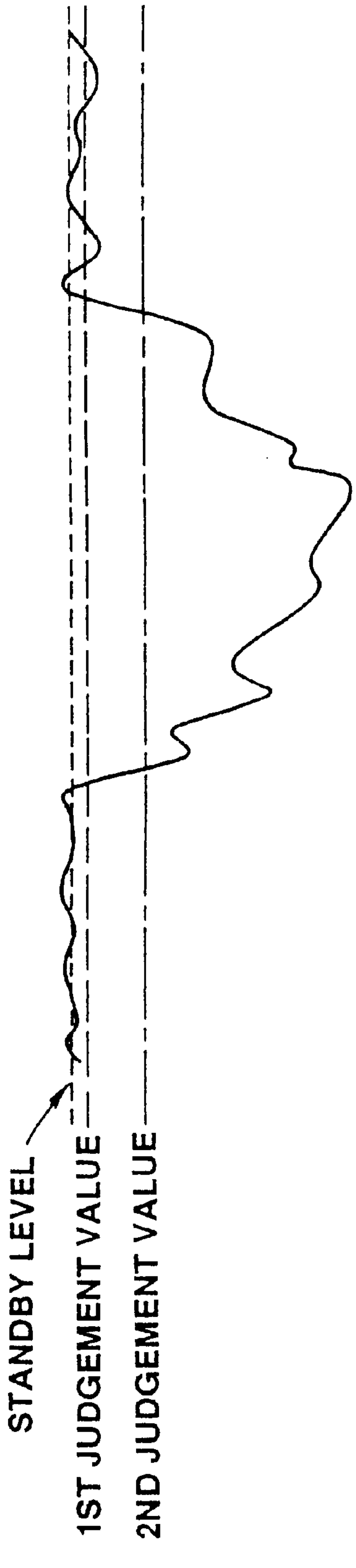
Figure 3:
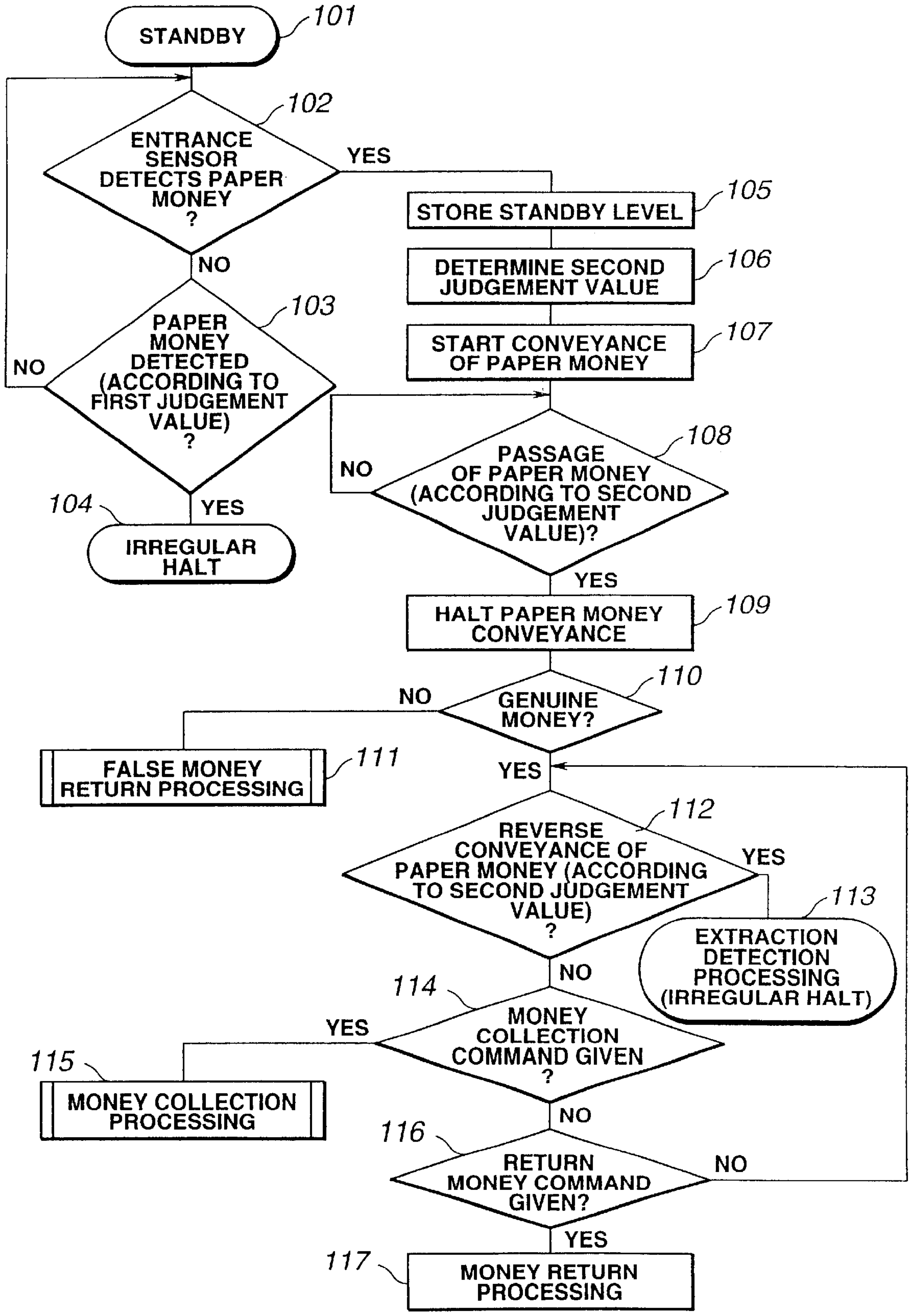
FIG. 3 is a flowchart illustrating a sequence of actions of a paper money processing apparatus 1.

FIGS. 2(*a*) and 2(*b*) are diagrams illustrating examples of standby levels and judgement values relating to the photosensor 12.

As shown in FIG. 2(*a*) and 2(*b*), the first judgement value is a predetermined fixed value and the second judgement value is obtained by changing the standby level by a specific ratio.

The action of the paper money processing apparatus 1 is described with reference to FIGS. 3–6.

When the power is switched on, the paper money processing apparatus 1 initially assumes a standby state (step 101). If the entrance sensor 11 does not detect a paper money (step 102; NO) and the photosensor 12 does detect a paper money at the first judgement value (step 103; YES), then the paper money processing apparatus 1 performs an irregular halt (step 104). This irregular halt is performed since there is a possibility that the reason why a paper money is detected even though no paper money has passed through the paper money input opening is because a paper money jam had occurred when the power supply to the apparatus was previously turned off (including turning off of the power supply due to a power cut). In this case, since the photosensor 12 has not passed to a standby state when the apparatus power was switched on, the second judgement value cannot be set, and therefore paper money detection is implemented using the first judgement value having a fixed level. Moreover, supposing that the photosensor 12 has detected a paper money according to the first judgement value, regardless of whether or not a paper money jam has actually occurred, then if this is a detection error due to soiling of the photosensor 12 and the photosensor 12 is soiled to the extent that detection error is occurring in the standby state, then an irregular halt will also be necessary in this case in order to carry out cleaning. However, provided that no paper money is detected according to the first judgement value continuously for a prescribed period of time representing a tolerable range in cases where the output of the photosensor 12 is unstable, then it is assumed that there is no paper money jam and that soiling of the photosensor 12 is within a tolerable range, and hence it is possible to proceed to subsequent processing, without performing an irregular halt.

If, on the other hand, the photosensor 12 does not detect the presence of a paper money (step 103; NO) and the entrance sensor 11 detects the insertion of a paper money (step 102; YES), then the control unit 10 records the output level (standby level) of the photosensor 12 in a standby state in the memory 15 (step 105), and it determines the second judgement value on the basis of this (step 106).

When the second judgement value has been determined, the control section 10 activates the drive circuit 19, thereby activating the shutter motor 20 and opening the shutter (not illustrated), and it also activates the drive circuit 16, thereby driving the paper money transfer motor 17 and initiating conveyance of the inserted paper money (step 107). When conveyance of the paper money has started, the control unit 10 awaits the passage of the paper money as detected from the output of the photosensor 12 on the basis of the second judgement value (step 108; NO), and when passage of the paper money has been detected (step 108: YES), the control unit 10 halts the paper money transfer motor 17 by means of the drive circuit 16, thereby halting conveyance of the paper money, and it activates the shutter motor 20 by means of the drive circuit 19, thereby closing the shutter (step 109).

In a state where the conveyance process has halted, the paper money assumes a state where it is held temporarily in reserve (escrow), and the authenticity of the inserted paper money held in this state is then determined (step 110). This authenticity judgement is carried out on the basis of the outputs from the photosensor 12 and the magnetic sensor 13 during the conveyance of the paper money in steps 107 to 109, and if the paper money is judged to be a false money (step 110; NO), then false money return processing is carried out (step 111), as described below.

On the other hand, if the paper money is judged to be a genuine money, then the control unit 10 awaits the issuing of a money collection command or money return command on the basis of the user's actions (NO at each of steps 112, 114, 116). If, during this time, reverse conveyance of the paper money is detected on the basis of the output from the photosensor 12 and the second judgement value (step 112; YES), then it is determined that an irregular extraction operation has been performed with regard to the paper money and extraction detection processing is implemented by carrying out an irregular halt (step 113). Here, an irregular halt is performed as the extraction detection processing, but it is also possible to perform processing such as:

1) Reactivating the shutter motor 20 and driving the shutter again in the closing direction;

2) Compulsorily storing (collecting) the temporarily held paper money;

3) Compulsorily subtracting an amount equivalent to the temporarily held paper money from the sum of money inserted; or 4) Compulsorily prohibiting acceptance of paper moneys for a prescribed period of time.

Furthermore, if no reverse conveyance of the paper money has been detected (step 112; NO) and a money collection command is issued (step 114; YES), then money collection processing is implemented as described below (step 115), and if a money return command is issued (step 116; YES), then money return processing is implemented as described below (step 117).

Figure 4:
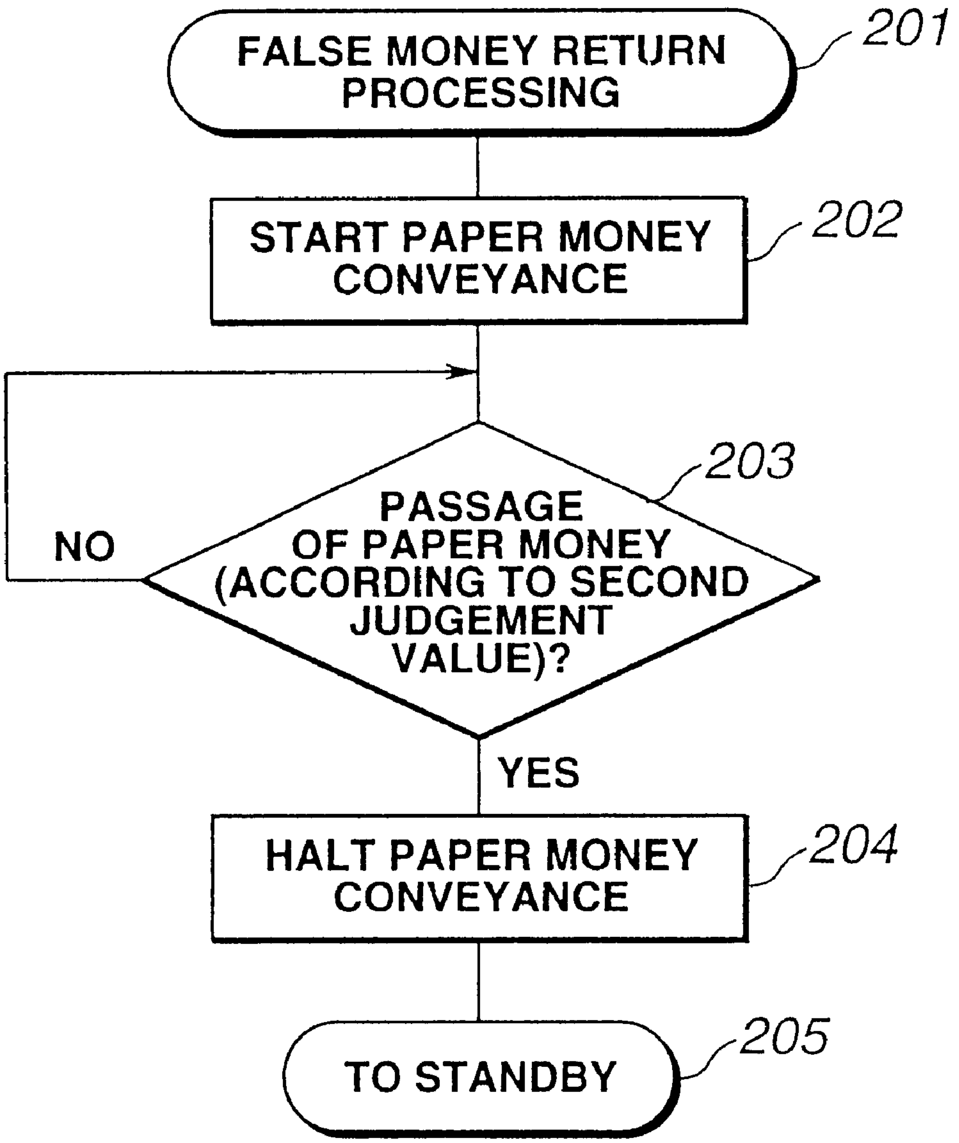
FIG. 4 is a flowchart illustrating a sequence of operations in false money return processing.

Next, the false money return processing in step 111 is described with reference to FIG. 4.

When false money return processing is started (step 201), the control unit 10 activates the drive circuit 19, thereby activating the shutter motor 20 and opening the shutter (not illustrated), and it also activates the drive circuit 16, thereby driving (reverse drive) the paper money transfer motor 17 and starting conveyance of the temporarily held paper money towards the paper money input opening (step 202). When conveyance of the paper money has started, the control unit 10 awaits passage of the paper money detected on the basis of the output from the photosensor 12 and the second judgement value (step 203; NO), and when passage of the paper money is detected (step 203; YES), the control unit 10 halts the paper money transfer motor 17 by means of the drive circuit 16 (step 204), and when it detects from the output of the entrance sensor 11 that the user has taken back the returned paper money, it activates the shutter motor 20 by means of the drive circuit 19, thereby closing the shutter and returning to a standby state (step 205).

Figure 5:
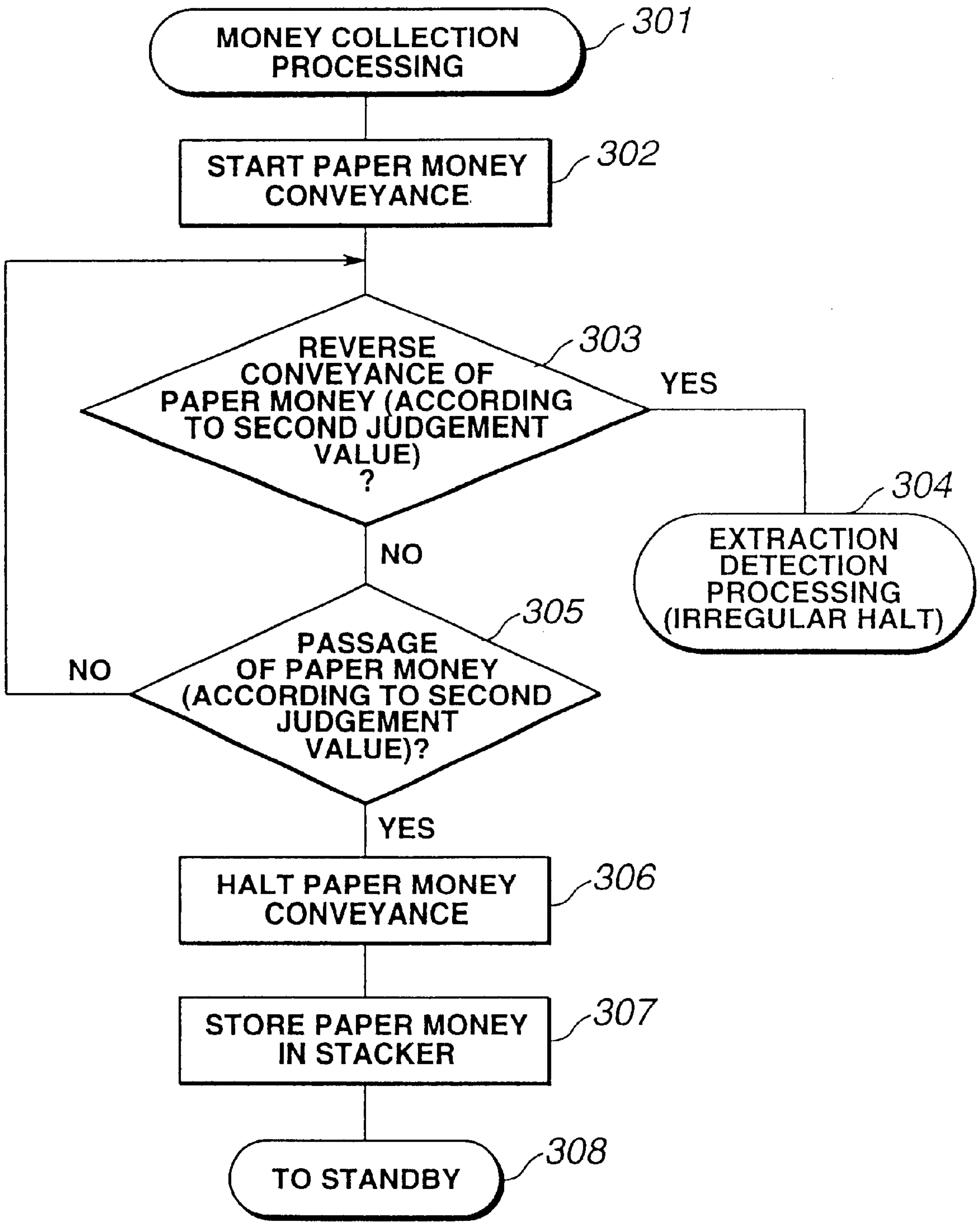
FIG. 5 is a flowchart illustrating a sequence of money collection processing.

Next, the money collection processing in step 115 is described with reference to FIG. 5.

When money collection processing is started (step 301), the control unit 10 activates the drive circuit 16, thereby driving (forward drive) the paper money transfer motor 17 and starting conveyance of the temporarily held paper money towards the stacker (step 302). When conveyance of the paper money has started, the control unit 10 awaits passage of the paper money as detected from the output of the photosensor 12 on the basis of the second judgement value (step 303, 305; NO). If, during this time, reverse conveyance of the paper money is detected from the output of photosensor 12 on the basis of the second judgement value (step 303; YES), then the control unit 10 assumes that an irregular extraction operation has been carried out with respect to the paper money and performs an irregular halt as the extraction detection processing (step 304). Similarly to the extraction detection processing in step 113 described above, other processing may be carried out instead of the irregular halt.

Furthermore, if no reverse conveyance of the paper money is detected (step 303; NO) and passage of the paper money is detected from the output of photosensor 12 on the basis of the second judgement value (step 305; YES), then the control unit 10 halts the paper money transfer motor 17 by means of the drive circuit 16, thereby halting conveyance of the paper money (step 306), and it activates the stack motor 22 by means of the drive circuit 21, thereby placing and storing the paper money in the stacker (not illustrated) (step 307), whereupon the apparatus returns to a standby state (step 308).

Figure 6:
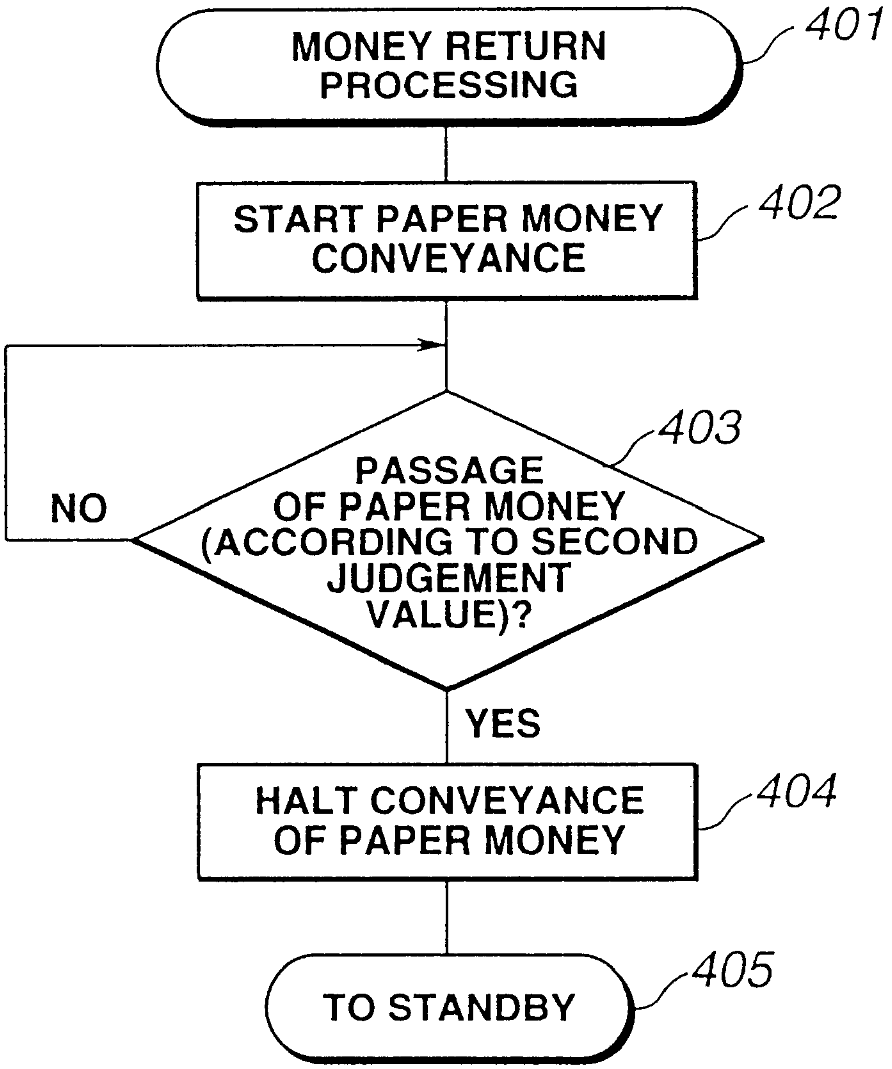
FIG. 6 is a flowchart illustrating a sequence of money return processing.

Next, the money return processing in step 117 is described with reference to FIG. 6.

When false money return processing is started (step 401), the control unit 10 activates the drive circuit 19, thereby activating the shutter motor 20 and opening the shutter (not illustrated), and it also activates the drive circuit 16, thereby driving (reverse drive) the paper money transfer motor 17 and starting conveyance of the temporarily held paper money in the direction of the paper money input opening (step 402). When conveyance of the paper money is started, the control unit 10 awaits passage of the paper money as detected from the output of the photosensor 12 on the basis of the second judgement value (step 403; NO). When passage of the paper money is detected (step 403; YES), the control unit 10 halts the paper money transfer motor 17 by means of the drive circuit 16 (step 404). When it is detected from the output of the entrance sensor 11 that the user has taken back the returned paper money, the shutter motor 20 is activated by means of the drive circuit 19, thereby closing the shutter and returning the apparatus to a standby state (step 405).

Although this embodiment has been described for a case where a photosensor for identifying the authenticity of the paper money is used to detect the presence of a paper money, this invention may also be applied to cases where a photosensor is used for the entrance sensor or passage sensor. In such cases, it is also possible to prevent detection error due to soiling.

INDUSTRIAL APPLICABILITY

This invention is configured in such a manner that two judgement values are set for determining the presence of a paper money from the output of an photosensor, namely, a predetermined first judgement value, and a second judgement value which is determined on the basis of the output of the photosensor in a standby state, when a paper money is inserted. According to this configuration, it is possible to detect paper money jams when the power supply is switched on and the limits of soiling of the photosensor, by using the first judgement value, and it is possible to process inserted paper moneys without detection error, by using the second judgement value.

Moreover, since the second judgement value is determined each time a paper money is inserted, paper moneys are processed without detection error, even in the case of temporary non-accumulative soiling, such as condensation, fogging, or the like, due to changes in the air temperature of humidity. Furthermore, since the second judgement value set in accordance with such temporary soiling is valid only for the paper money inserted at the time that this value is set, there is no decline in accuracy for paper moneys inserted subsequently.

What is claimed is:

1. A paper money processing method wherein position of an inserted paper money is detected on the basis of presence or absence of the paper money by a plurality of sensors including at least one photosensor, the inserted paper money being conveyed to be accepted or returned on the basis of the position of the paper money thus detected, wherein a judgement value for judging presence or absence of the paper money is set and stored each time a paper money is inserted according to output level of the photosensor in a standby state immediately prior to insertion of the paper money, and the stored judgement value is compared with the output level of the photosensor, and the presence or absence of the inserted paper money is detected on the basis of results of the comparison.

2. The paper money processing method according to claim 1, wherein the judgement value is a value lower than the output level of the photosensor in the standby state by a predetermined ratio.

3. A paper money processing method wherein position of an inserted paper money is detected on the basis of presence or absence of the paper money by a plurality of sensors including at least one photosensor, the inserted paper money being conveyed to be accepted or returned on the basis of the position of the paper money thus detected, comprising:

an entrance sensor for detecting that a paper money has been inserted;

setting means for setting a judgement value for judging the paper money each time that insertion of a paper money is detected by the entrance sensor according to output level of the photosensor when the insertion of the paper money is detected;

storage means for storing the judgement value set by the setting means;

detection means for comparing the judgement value stored in the storage means with output level of the photosensor, and detecting absence or presence of the inserted paper money on the basis of the comparison results from the comparing means.

4. The paper money processing apparatus according to claim 3, wherein the storage means stores a predetermined judgement value as a first judgement value and stores the judgement value set by the setting means as a second judgement value, and wherein the detection means compares the first judgement value stored in the storing means with the output level of the photosensor in a state where the entrance sensor has not detected insertion of a paper money, and compares the second judgement value stored in the storing means with the output level of the photosensor in a state where the entrance sensor has detected insertion of a paper money.

5. The paper money processing method according to claim 1, wherein the judgement value is set according to the output level of the photosensor after comparing the output level of the photosensor with a predetermined value and confirming that paper money is absent based on result of the comparison.

6. The paper money processing apparatus according to claim 3, wherein the setting means sets a value lower than the output level of the photosensor when the entry sensor detects the insertion of paper money by a predetermined ratio as the judgement value.

* * * * *